United States Patent
Verma

(10) Patent No.: US 11,543,804 B2
(45) Date of Patent: Jan. 3, 2023

(54) SYSTEM AND METHOD FOR REMOTELY MANAGING CONFIGURATION OF INDUSTRIAL MACHINES

(71) Applicant: SIEMENS AKTIENGESELLSCHAFT, Munich (DE)

(72) Inventor: Amit Verma, Taufkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/266,573

(22) PCT Filed: Aug. 7, 2019

(86) PCT No.: PCT/EP2019/071228
§ 371 (c)(1),
(2) Date: Feb. 5, 2021

(87) PCT Pub. No.: WO2020/030698
PCT Pub. Date: Feb. 13, 2020

(65) Prior Publication Data
US 2021/0311461 A1 Oct. 7, 2021

(30) Foreign Application Priority Data
Aug. 7, 2018 (EP) .................................... 18187752

(51) Int. Cl.
*H04L 12/24* (2006.01)
*G05B 19/418* (2006.01)
(Continued)

(52) U.S. Cl.
CPC ...... *G05B 19/4184* (2013.01); *H04L 41/0803* (2013.01); *H04L 67/12* (2013.01);
(Continued)

(58) Field of Classification Search
CPC ...... G05B 19/4184; G05B 2219/25068; G05B 2219/31088; G05B 19/4185; H04L 41/0803; H04L 67/12; Y02P 90/02
See application file for complete search history.

(56) References Cited

U.S. PATENT DOCUMENTS

2005/0188268 A1 8/2005 Verbowski
2014/0189086 A1* 7/2014 Chattopadhyay ... H04L 41/0873
709/223
(Continued)

FOREIGN PATENT DOCUMENTS

EP 2846208 A2 3/2015

OTHER PUBLICATIONS

International Preliminary Report on Patentability for International Patent Application PCT/EP2019/071228 dated Nov. 10, 2020.
(Continued)

*Primary Examiner* — Kim T Nguyen
(74) *Attorney, Agent, or Firm* — Lempia Summerfield Katz LLC

(57) ABSTRACT

This invention describes a method for detecting a misconfiguration of a machine function of a first industrial machine (M1). A set (N) of second industrial machines (MS) from said several other industrial machines (MO) is created by identifying a predetermined feature of the first industrial machine (M1) in several other industrial machines (MO). A first configuration value is created, which relates to the machine function of the first industrial machine (M1), and a second configuration value is created which relates to the machine function of the second industrial machines (MS). Depending on a relation of the first configuration value to the second configuration value a deviation value is determined by a configuration anomaly detection module (CADM). For detecting the misconfiguration of the first industrial machine
(Continued)

(M1) the deviation value is compared with a predetermined threshold value.

20 Claims, 2 Drawing Sheets

(51) Int. Cl.
    *H04L 41/0803*     (2022.01)
    *H04L 67/12*     (2022.01)
(52) U.S. Cl.
    CPC .............. *G05B 2219/25068* (2013.01); *G05B 2219/31088* (2013.01)

(56) References Cited

U.S. PATENT DOCUMENTS

2017/0329315 A1* 11/2017 Kanemaru ....... G05B 19/41815
2018/0035572 A1     2/2018 Song

OTHER PUBLICATIONS

International Search Report and the Written Opinion for International Patent Application PCT/EP2019/071228 dated Nov. 7, 2019.
Lee, Jay, Behrad Bagheri, and Hung-An Kao. "A cyber-physical systems architecture for industry 4.0-based manufacturing systems." Manufacturing letters 3 (2015): 18-23.

* cited by examiner

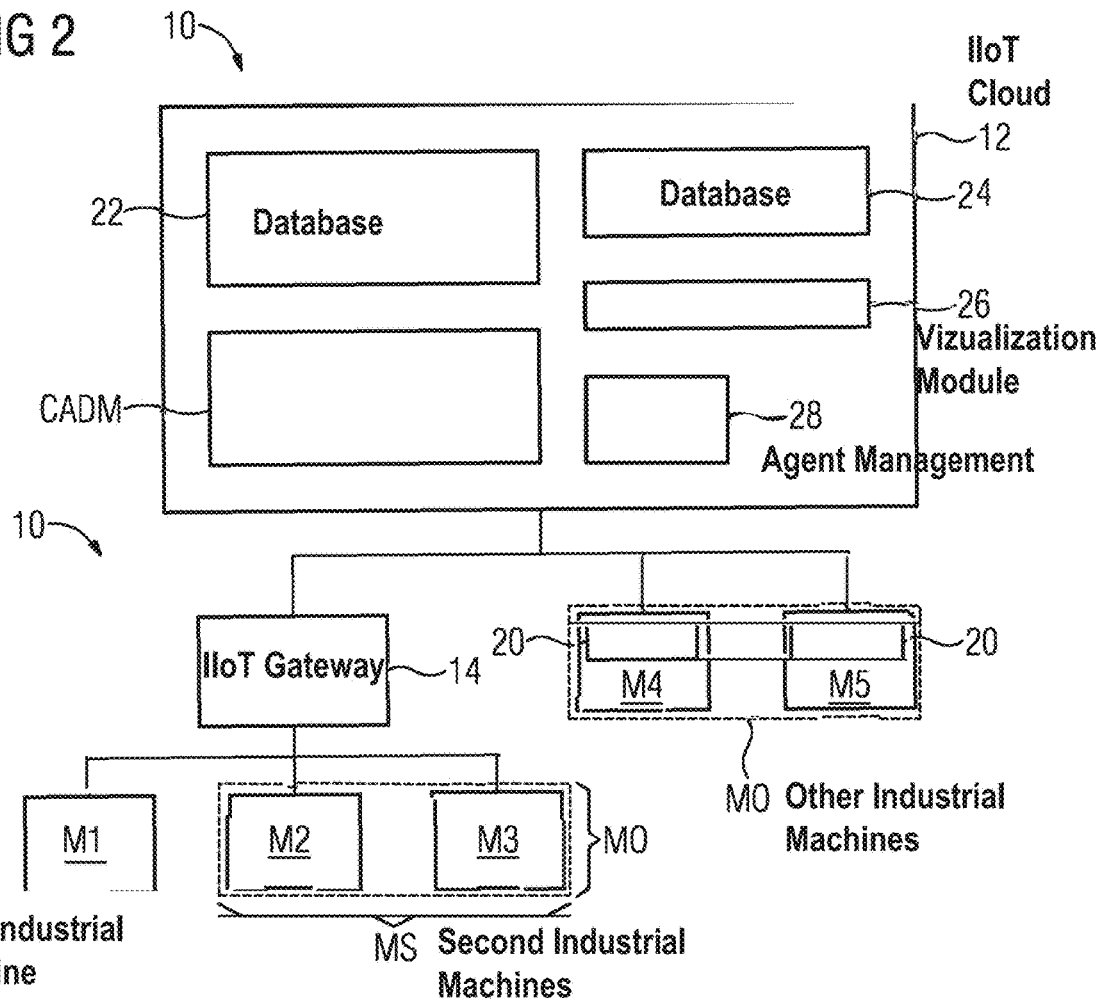
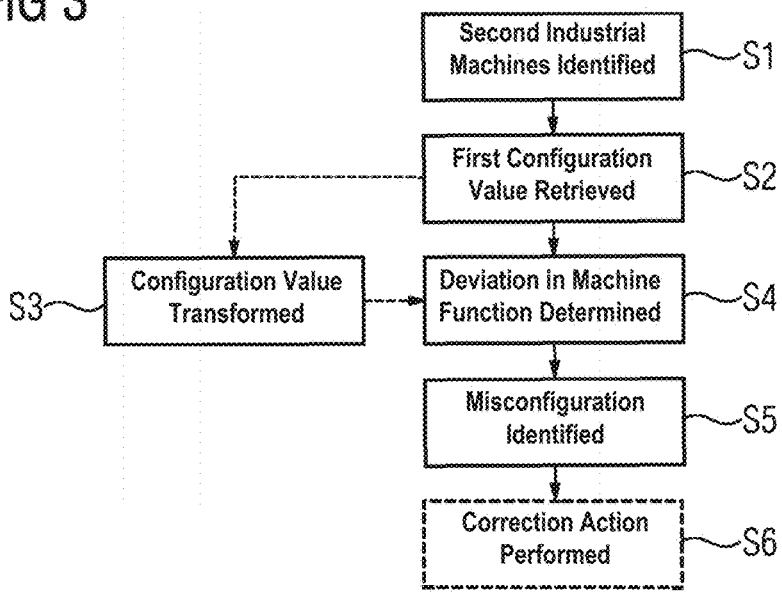

SYSTEM AND METHOD FOR REMOTELY MANAGING CONFIGURATION OF INDUSTRIAL MACHINES

This application is the National Stage of International Application No. PCT/EP2019/071228, filed Aug. 7, 2019, which claims the benefit of European Patent Application No. EP 18187752.3, filed Aug. 7, 2018. The entire contents of these documents are hereby incorporated herein by reference.

BACKGROUND

The present embodiments provide a method for detecting a misconfiguration of a machine function of a first industrial machine that is connectable to a network system that includes several other industrial machines. This present embodiments also include a managing system that is able to detect a misconfiguration of an industrial machine.

There is an increasing trend of industrial automation systems, assets, machines, sensors, etc. being connected to the industrial internet of things cloud directly or via cloud gateways. Industrial assets such as printing machines, machine tools, and industrial processes involve complex configuration settings that determine the operation and behavior of these assets. A growing part of this configuration is software-defined configuration.

The document US 2014/0189086 A1 describes methods, systems, and computer storage media for detecting anomalies within nodes of a data center. A self-learning system is employed to proactively and automatically detect the anomalies using one or more locally hosted agents for pulling information that describes states of a plurality of nodes. A comparison technique that includes comparing a state information of the plurality of the nodes against one another is applied. Based upon the comparison, one or more nodes of the plurality of nodes are grouped into clusters that exhibit substantially similar state information. Upon identifying the clusters that include low number of nodes grouped therein, with respect to a remainder of the clusters of nodes, the members of the identified clusters are designated as anomalous machines.

Any errors in configuration of these complex assets are difficult to detect and to troubleshoot. Very often this leads to costly visits by the service personnel of the Original Equipment Manufacturer (OEM) of the machine to the end customer. The resulting downtime of the machine often leads to production losses. Further, if some of these assets or machines are sub-optimally configured, the production process may not be optimal and the maintenance and lifecycle management of these machines may not be optimized.

Very often there is a recommended configuration of a machine that is provided by an original equipment manufacturer (OEM). If any configuration errors are suspected during the operation of a machine, the configuration is compared with the recommended configuration of the OEM, and then, the configuration is rectified. This comparison of configuration mostly happens manually or via an automated tool. Nowadays, industrial machines may be used for a wide variety of use cases so that the master configuration from an OEM might not be the optimal configuration for different use cases.

Moreover, the optimal configuration that is set for a machine may change during its lifecycle. It may be quite cost intensive or inconvenient if every single industrial machine has to be checked by the service personnel.

SUMMARY AND DESCRIPTION

The scope of the present invention is defined solely by the appended claims and is not affected to any degree by the statements within this summary.

In many use cases, it is quite difficult or time-consuming to detect industrial machines that are not configured optimally. The present embodiments may obviate one or more of the drawbacks or limitations in the related art. For example, a method that enables remotely managing configuration of machine function in each industrial machine is provided.

This present embodiments describe a method for remotely managing configuration of machine function in a plurality of industrial machines.

The network system may be formed as a cloud system. This cloud system, for example, may be an industrial internet of things cloud system. Industrial machines may be machines that are used for manufacturing processes. A welding robot, for example, may be such an industrial machine.

In act a), a set of second industrial machines from the number of other industrial machines is identified based on a predetermined feature of the first industrial machine in the number of other industrial machines. The idea of the present embodiments is not to analyze one single industrial machine without considering other industrial machines. It is intended to consider other industrial machines that are comparable concerning the machine function that is to be analyzed. In other words, the second industrial machines are to be similar to the first industrial machine at least concerning the machine function that is to be analyzed.

To do this, the predetermined feature of the first industrial machine is identified in the number of other industrial machines. If, for example, the machine function is "displaying time" generally, all industrial machines that are able to show time may be added to the set of second industrial machines.

There may be other industrial machines that do not include the machine function "displaying time". This may be air-conditioning machines, for example, that do not have a time function. In this case, the first industrial machine and the set of second industrial machines only contain industrial machines that at least include the machine function "displaying time". Depending on the predetermined feature, the set of second industrial machines may be composed differently.

In act b), a first configuration value that relates to the machine function of the first industrial machine is retrieved and/or created, and a second configuration value that relates to the machine function of the second industrial machines is retrieved and/or created. It is also possible that several first configuration values relate to the machine function of the first industrial machine. Analogously, this is also valid for a number of second configuration values of the second industrial machines. This provides that a number of configuration values may describe a machine function. The machine function itself may be quite general, and the machine function may be divided into a number of sub functions. In this case, every first configuration value or second configuration value may relate to the corresponding sub-function of the machine.

For example, if the machine function is described as "heat management", a number of sub-functions may be possible. One sub function may be the dimensions of heating elements, another sub-function may be a current that is used for the heating elements, or a surface temperature of the industrial machine. In this case, the machine function "heat management" splits up into a number of sub-functions. It is possible that one single first configuration value or second configuration value is created for the machine function and/or a number of first or second configuration values are created, where each configuration value may relate to the sub-function of the machine function.

Each configuration value represents a configuration of the machine function of the first industrial machine or one of the second industrial machines. This provides that each configuration value does not relate to a number of industrial machines. One single configuration value represents either the machine function of one single industrial machine or the sub-function of this machine function. This industrial machine may be the first industrial machine or one of the second industrial machines. It is not possible that the first configuration value relates to a machine function of one of the second industrial machines. The second configuration value may relate to the machine function or sub-function of one of the second industrial machines.

Analogously, a second configuration value does not relate to a machine function of the first industrial machine. In one embodiment, one single first configuration value or a number of first configuration values relate to one single first industrial machine. Nevertheless, the first configuration value may refer to the machine function, which itself may contain several sub-functions. The same is analogously true for the second configuration values. In one embodiment, the number of second configuration values are arranged to form a number of second vectors or matrices. In the case of the machine function "heat management", the first industrial machine may be assigned one single first configuration value or one single first configuration vector. In this case, the first configuration value relates to the machine function "heat management". This first configuration value does not consider different sub-functions in this case.

This patent application uses the terms "configuration value", "configuration vector", and "configuration matrix". The configuration matrix may be composed of a number of configuration vectors. A configuration vector may be composed of a number of configuration values. At the extreme, a configuration vector may only include one single configuration vector, and a configuration matrix may include one single configuration vector. In this case, the terms "configuration value", "configuration vector", and "configuration matrix" may be the same. The present embodiments may be extended from the term configuration value to the term configuration vector or vice versa. The same is true for the term configuration matrix. The principle of the present embodiments remains the same, only the calculations may get more complicated.

In act c), a deviation value of the machine function of the first industrial machine is determined depending on a relation of the first configuration value of the first industrial machine to the second configuration value of the set of second industrial machines. Also, in this act, a number of first configuration values and a number of second configuration values may be applied. In this case, the number of first configuration values may refer to different sub functions that are part of the machine function. The relation of the first configuration value to the second configuration value may be a simple comparison or a complex analysis. It is only relevant that the deviation value is somehow determined based on the first configuration value and the second configuration value. The second configuration value may be representing an average configuration value of all second industrial machines. It is also possible that every second industrial machine has its own second configuration value.

In this case, the deviation value may be determined by considering the first configuration value and the number of second configuration values. In the case when a machine function is split up into several sub-functions, also a number of first configuration values and a number of second configuration values may be considered for the determining of the deviation value of the machine function of the first industrial machine. In every situation, the deviation value is not determined only by considering the first configuration value and no second configuration value. In any situation, at least one first configuration value and at least one second configuration value are considered for determining the deviation value.

In act d), a misconfiguration of the first industrial machine is detected based on a comparison of the deviation value with a predetermined threshold value. The deviation value of act c) is compared with a predetermined threshold value for detecting the misconfiguration of the first industrial machine. Also, this act may be extended to a number of deviation values. In this case, each sub-function of the machine function may be associated with a corresponding deviation value. In this case, every deviation value may be assigned to a corresponding sub-function of the machine function. The number of deviation values may be combined to one single deviation value as an end result. In the case of the number of deviation values, each deviation value may be compared with a corresponding threshold value. This provides that in this case, a number of threshold values may be predetermined. Each deviation value may be compared with a corresponding threshold value.

This method offers an automatic method to detect a misconfiguration of an industrial machine. The method may be implemented into an algorithm that may scan a large number of industrial machines. For example, if thousands of industrial machines are to be analyzed, this method may effectively figure out which industrial machines have a misconfiguration or are not configured optimally. In this case, the service personnel does not need to check every single industrial machine. The service personnel may focus on the detected misconfigured industrial machines. It may be sufficient if only the misconfigured machines that are detected by this method are further analyzed. This may prevent an unnecessary downtime of the industrial machines and further prevent production losses.

Another embodiment of the present embodiments describes a method, where each configuration value is assigned to a configuration vector and each configuration vector includes the configuration value concerning a single industrial machine that is either the first industrial machine or one of the second industrial machines. It is possible that the configuration vector only contains one or more configuration values of a single industrial machine. This embodiment may be regarded as "vectorization of the machine function". Usually, a number of configuration values for each industrial machine are to be analyzed. It may be very efficient to combine a number of first or second configuration values to a corresponding configuration vector or configuration matrix. For example, all first configuration values that relate to the machine function of the first industrial machine may be combined to a first configuration vector. Analogously, the second configuration values may be combined to a second configuration matrix or a second configuration vector. Since the second industrial machines contain a number of machines, it is often useful to apply a number of second configuration vectors.

Alternatively, the number of second configuration vectors may be combined to one single second configuration matrix. In this case, every configuration vector may refer to one single industrial machine of the second industrial machines. The acts c) and d) are correspondingly performed by using configuration vectors instead of configuration values. The vectorization of the configuration values may further improve the determining of the deviation value and the detecting of the misconfiguration of the first industrial machine.

In another embodiment, act c) includes a comparison of the configuration vector of the first industrial machine to the other configuration vectors of the second industrial machines. This comparison may be a simple subtraction of the first configuration vector with each of the other second configuration vectors. In one embodiment, the subtraction is performed a number of times according to the quantity of the second industrial machines. Each subtraction may create a result that may be further processed into an end result.

In one embodiment, the first configuration vector contains configuration values of the first industrial machine, and analogously, the second configuration vectors contain the second configuration values. Instead of a simple subtraction, also, a complex vector analysis may be applied to determine the deviation value of the machine function of the first industrial machine. The comparison of different configuration vectors may be regarded as an extension to the original act c). In this embodiment, a number of configuration values that are combined to a configuration vector may be considered for determining the deviation value. If the comparison is configured as a simple subtraction, the comparison may easily be performed and does not consume a lot of digital resources.

Another embodiment provides a method, where the predetermined feature of the first industrial machine to identify the set of second industrial machines is based on metadata of the first industrial machine. Metadata may describe an industrial machine generally. For example, the name of the manufacturer of the industrial machine and its main purpose may classify the first industrial machine. In this case, a number of pieces of information may form the metadata. This provides that the metadata may include one single piece of information or several pieces of information.

In one embodiment, all second industrial machines match the first industrial machine according to the metadata. For example, if the metadata contain the pieces of information ABC as the name of the manufacturer and the main function "welding", then all industrial machines may be machines from the manufacturer ABC and these machines may be welding machines. If the metadata contained further pieces of information, then the quantity of the second several machines may be further limited.

The definition of the metadata or the predetermined feature mostly directly influences the quantity of the number of second industrial machines. This provides that the quantity of the second industrial machines may be influenced by the predetermined feature of the definition of the metadata. For example, if only very few specific industrial machines are to be analyzed, usually the metadata contain several different pieces of information. For example, if only indoor industrial machines are to be analyzed, the metadata may further contain the information "indoors". With respect to the mentioned example, only industrial machines that are ABC machines, welding robots, and located indoors would be assigned to the second industrial machines. This allows a target-orientated analysis of industrial machines. The method for detecting the misconfiguration may be performed depending on different requirements or specifications.

Another embodiment describes a method further including transforming a non-numerical first or second configuration value referring to a non-numerical machine function into a numerical value in act b) (e.g., by assigning the non-numerical value configuration value to a binary value or a predetermined numerical value) for determining the deviation value in act c).

Another embodiment provides a method, where a normalized value for the first configuration value or the second configuration value is calculated if the underlying machine function is a numerical type of configuration. This provides that the first configuration value or the second configuration value is not an absolute value but a normalized value. In one embodiment, the normalized value considers the first and second configuration values. For example, the normalized value is formed as a reference value. In one embodiment, the reference value considers the first and second configuration values. In some cases, a normalized value may be better than an absolute value. For example, the current of a welding machine is to be expressed by a normalized value. In this case, the welding current of the first industrial machine may be expressed relative to the maximum current, which is available at the first industrial machine or one of the second industrial machines.

If, for example, the first industrial machine uses a welding current of 50 A and a maximum welding current at another industrial machine would be 100 A, then the normalized value would be 50% or 0.5. It is also possible to calculate the normalized value by another method. For example, a ratio containing the first configuration value, the maximum configuration value, and the minimum configuration value may be used. The following ratio value of the first industrial machine divided by a difference of a maximum value and a minimum value may be used as a normalized value. This provides that normalized values are especially reference values that consider the other industrial machines. This provides that a normalized value already contains information about at least one other machine than the first industrial machine.

Another embodiment describes a method, where the first configuration value or the second configuration value is a binary value if the underlying machine function is a binary type of configuration. A binary type of configuration usually offers two different possible states of options. The industrial machine may have two different states. The industrial machine may be switched on or off, for example. An example for a binary value would be 0 or 1. 0, for example, may refer to an industrial machine that is switched off. The binary value 1 may refer to an industrial machine that is switched on. Also, other binary configurations may be described by the binary value. In most cases, the figures 0 and 1 are used, but other figures may also be applied. A binary value is usually easy to evaluate, and therefore, this may improve the detection of the misconfigured industrial machine.

Another embodiment describes a method, where the configuration value is a numerical value even if the underlying machine function is a non-numerical type of configuration. The method aims at determining the deviation value of the machine function of the first industrial machine. Therefore, it is suitable to provide that each configuration value is of a numerical type. Nevertheless, some configuration settings may be of a non-numerical type.

In this embodiment, for a non-numerical type of configuration settings, numerical values may be created and assigned to the non-numerical type of configuration. A non-numerical type of configuration, for example, may be the connection type of the industrial machine to other industrial machines. For example, the first industrial machine may be connected to other industrial machines via a CAN-BUS, a MOD-BUS, OPC, Bluetooth, or other types of connections. For determining the deviation value, it is very advantageous to assign numbers to these different types of connections. For example, the number 1 may be assigned to a connection type MOD-BUS, the number 2 may be assigned to the connection type OPC, number 3 may be assigned to the CAN-BUS connection, and the number 4 may be assigned to the Bluetooth connection. In this case, the configuration value 4 indicates that the corresponding industrial machine is connected to other industrial machines via a Bluetooth connection. Analogously, a configuration value of 3 would stand for a CAN-BUS connection.

Another embodiment of the present embodiments describes a method, where the configuration value is a standard deviation value if the underlying machine function is a numerical type of configuration. In this case, the standard deviation value may directly indicate a deviation of the configuration value with respect to a mean configuration value. Large deviations may easily be identified by applying a standard deviation value as configuration value.

The present embodiments describe a method, where act c) includes determining a separate deviation value for each first configuration value of the machine function of the first industrial machine depending on the relation of the respective first configuration value of the first industrial machine with a corresponding second configuration value of the second industrial machines. The main difference compared to act c) is that for each first configuration value, a separate deviation value is determined. This provides, for example, that number of deviation values may be determined. If a number of first configuration values are present, a number of separate deviation values are determined according to this embodiment.

Each separate deviation value may indicate a deviation of the corresponding first configuration value. If the machine function is split up in a number of sub-functions, every sub function may be described by the corresponding configuration value. Further, every sub-function may be independently analyzed since every sub-function may be assigned to another separate deviation value. This provides that with respect to the first industrial machine, each deviation value may be assigned to a sub-function that is described by the corresponding first configuration value. In one embodiment, each separate deviation value considers the second configuration values or second configuration vectors. By determining separate deviation values, the method for detecting a misconfiguration of an industrial machine may be further refined. This provides that a number of machine functions may be analyzed more in detail.

The present embodiments include a method, where detecting the misconfiguration of the machine function of the first industrial machine in act d) includes a comparison of each deviation value with a predetermined threshold value for identifying the misconfiguration that causes the misconfigured machine function of the first industrial machine. For example, each separate deviation value may be compared with a separate predetermined threshold value for identifying the misconfiguration that causes the misconfigured machine function of the first industrial machine. This provides that not only a number of separate deviation values may be determined, but additionally, a number of separate threshold values may be predetermined.

Therefore, another embodiment describes a method, where the misconfiguration of the machine function associated with the first industrial machine is detected if each separate deviation value is greater than a corresponding predetermined threshold value. This may help to identify the misconfiguration correctly.

It is possible that each separate deviation value may be compared to a corresponding separate predetermined threshold value. Depending on which separate deviation value exceeds the corresponding separate predetermined threshold value, the misconfiguration that causes the misconfigured machine function of the first industrial machine may be identified. This provides that not only the fact that there is a misconfigured machine may be identified, but further, even the misconfiguration that causes the misconfigured machine may be identified.

For example, a sub-function of a machine that is not optimally configured may be identified by applying the method of this embodiment. This further refines the method of detecting misconfigured industrial machines. Due to this refinement, not only the misconfigured machine may be identified, but even the misconfigured machine function of the industrial machine may be identified. For example, if all industrial machines should be connected via Bluetooth with each other, a configuration value of the upper example of one or two would indicate a misconfigured industrial machine. Further, the deviation of the desired value (e.g., Bluetooth) is assigned to value 4, which indicates that the first industrial machine is misconfigured, since the first industrial machine includes another connection configuration than Bluetooth. Therefore, that industrial machine and the misconfigured machine function may be nominated, and with these pieces of information, a service personnel of industrial machines may easily correct the configurations of the first industrial machine.

Another embodiment describes a method, where a Euclidian distance from the configuration vector of the first industrial machine to all second industrial machines is calculated for determining the deviation value in act c). If a number of deviation values differ from the corresponding threshold value, the Euclidian distance may generate an overall quantity of deviation. This may help to assess the misconfiguration better.

Another embodiment describes a method, where in act c), a k-nearest neighbors analysis, a Support Vector Machine analysis, a neural network, and/or a correlation based analysis are applied to the configuration values of act b) for determining the deviation value. These different types of analyses may be regarded as different methods of anomaly detections.

The k-nearest neighbors analysis may be regarded as a non-parametric method that may be used for estimating probability density functions. This method may be used for the purposes of classification. This method may also be used for regression. In most cases, the k-nearest neighbors method uses k-closest training examples in the features base. The output of this analysis usually depends on whether the k-nearest neighbors analysis is used for classification or regression. If the k-nearest neighbors analysis is a classification, the output is often a class membership. An object may be classified by a majority vote of neighbors of the object, with the object being assigned to a class most common among k-nearest neighbors of the object. The k-nearest neighbors analysis may be regarded as an instance-based learning or as a lazy learning method. The k-nearest neighbors analysis aims to find out if the configuration vector or the first configuration value and the second configuration value appear to be anomalous with respect to the other configuration vectors or values. This provides that the k-nearest neighbors analysis may be used to identify whether the configuration vector or the first configuration values of the first industrial machine may be anomalous or unusual. Thereto, the k-nearest neighbors analysis considers the second configuration values or the second configuration vectors in order to assess the configuration values of the first industrial machine. The k-nearest neighbors analysis is often associated with machine learning algorithms.

The support vector machine analysis is another type of machine learning method. The support vector machine analysis often uses a set of training examples, each marked as belonging to one or another category. For example, the support vector machine analysis tries to create a model that assigns new examples to the one category or the other category. The support vector machine model is often a representation of the examples as points in space, which are mapped such that the examples of the separate categories are divided by a clear gap that is as wide as possible. New examples may be mapped into that same space and predicted to belong to a category based on which side of the gap the new examples fall.

The industrial machines may be split up into two categories by using the support vector machine analysis. The first category may contain industrial machines that are correctly configured, and the second category may contain industrial machines that are misconfigured. A new industrial machine (e.g., the first industrial machine) may be assigned to one of these two categories by applying the support vector machine analysis. In order to create these two categories, the support vector machine analysis tries to construct a hyperplane that clearly separates the set of training examples. In this case, the training examples would be the set of second industrial machines. In most cases, the hyperplane is constructed in a way so that the nearest training data of any points of the training examples have the largest distance to the hyperplane. This may provide that an effective hyperplane that clearly separates the training examples into different categories may be constructed.

In order to determine the deviation value, the neural network or a correlation based analysis may also be applied. A correlation based analysis may show deviations from an average configuration value. Since the first industrial machine and all of the second industrial machines at least share one machine function, the first industrial machine and the second industrial machines may be regarded as similar concerning this machine function. A misconfigured machine, for example, would show a large deviation from the average configuration that results from the other industrial machines.

A neural network may be trained with different training examples or training data so that the neural network may recognize misconfigured industrial machines autonomously. All these different methods or analyzes may be used for detecting a misconfigured industrial machine. Further, these analyses or methods may also be able to find out which configuration is making the machine configuration abnormal.

Another embodiment of the present embodiments describes a method, where the method is triggered periodically and/or in the case that a new industrial machine is connected to the network system. If it is assumed that an industrial machine is not correctly configured, the method for detecting the misconfigured industrial machine may be triggered manually.

It is also possible that this method may be performed periodically. For example, the method for detecting a misconfigured machine may be implemented in an algorithm that searches for misconfigured industrial machines in the background. Especially in the case that a new industrial machine is connected, it is useful to apply this method. In this case, the method for detecting a misconfigured industrial machine would automatically be performed. This may help to provide that a plurality of industrial machines is correctly configured.

The present embodiments also provide a managing system for managing configuration of a machine function. The managing system includes a first industrial machine to be examined regarding a configuration of a machine function. This managing system also includes a number of other industrial machines, where the first industrial machine is connectable to a network system including a number of other industrial machines. In one embodiment, the industrial machines include an interface for a connection to the network system. Further, this managing system includes a configuration anomaly detection module that is configured to identify a set of second industrial machines from the number of other industrial machines based on a predetermined feature of the first industrial machine in the number of other industrial machines.

Further, this configuration anomaly detection module is configured to retrieve and/or to create a first configuration value that relates to the machine function of the first industrial machine; retrieve and/or to create a second configuration value that relates to the machine function of the second industrial machines; and determine a deviation value of the machine function of the first industrial machine depending on a relation of the first configuration value of the first industrial machine to the second configuration value of the set of second industrial machines. The configuration anomaly detection module is configured to detect a misconfiguration of the first industrial machine based on a comparison of the deviation value with a predetermined threshold value. The explanations of the different embodiments and examples are analogously valid for the managing system.

Usually, each industrial machine includes an interface for a connection to the network system. This provides that the industrial machines do not have to be connected to the network system all the time. For example, an industrial machine may be temporarily connected to the network system. In this case, the configuration values or configuration vectors may be extracted at a time when this industrial machine was connected to the network system. This data may be saved and used later on. Therefore, it is not needed that the industrial machines are connected to the network system all the time. It is sufficient if the industrial machines have an interface for a connection to the network system. Once the industrial machines are connected to the network system, configuration values or configuration settings of the industrial machines may be extracted and used later.

Another embodiment of the present embodiments shows a managing system including the network system formed as a cloud system (e.g., as an industrial internet of things cloud). It is difficult to differentiate the terms network system, cloud system, and industrial internet of things cloud. Often, a network system is mentally associated with a network of machines that are located in a building. If further industrial machines shall be connected to this network system that are not located in this building, often, the term cloud system is used. If, for example, industrial machines in India and Europe are connected to a network system, the network system is often called cloud system. The term IoT represents the term internet of things. The term IoT represents the term industrial internet of things. The internet of things is usually a network of physical devices (e.g., a number of industrial machines). The number of industrial machines are able to connect with each other, and the number of industrial machines may exchange data. This provides that the number of industrial machines may form a cloud system. Since these machines are industrial machines, the IoT cloud becomes the IoT cloud.

A further embodiment of the present embodiments describes a managing system that includes a configuration database for retrieving the configuration value, an IoT agent, an IoT gateway, an agent management, and/or an IoT database for operating the network system and/or a visualization module. This visualization module may indicate misconfigured industrial machines visually so that an operator may easily identify the misconfigured industrial machine. The IoT database may contain configuration values of industrial machines that are not connected to the IoT cloud system. The IoT gateway and IoT agent are used to operate the cloud system. These two modules may connect industrial machines to the cloud system. In one embodiment, an IoT agent may connect a single industrial machine to the cloud system, and an IoT gateway may connect a number of industrial machines to the cloud system.

Another embodiment of the present embodiments offers a computer program product with program code means that are stored on a computer-readable medium (e.g., a non-transitory computer-readable storage medium) to conduct a method of one or more of the present embodiments if the computer program product is processed on a processor of an electronic control unit. The electronic control unit may be part of the configuration anomaly detection module.

BRIEF DESCRIPTION OF THE DRAWINGS

FIG. 2 is another sketch of one embodiment of the managing system with a number of modules in the cloud system; and FIG. 3 is an example of a method flowchart for managing configuration of an industrial machine.

DETAILED DESCRIPTION

Figure 1:
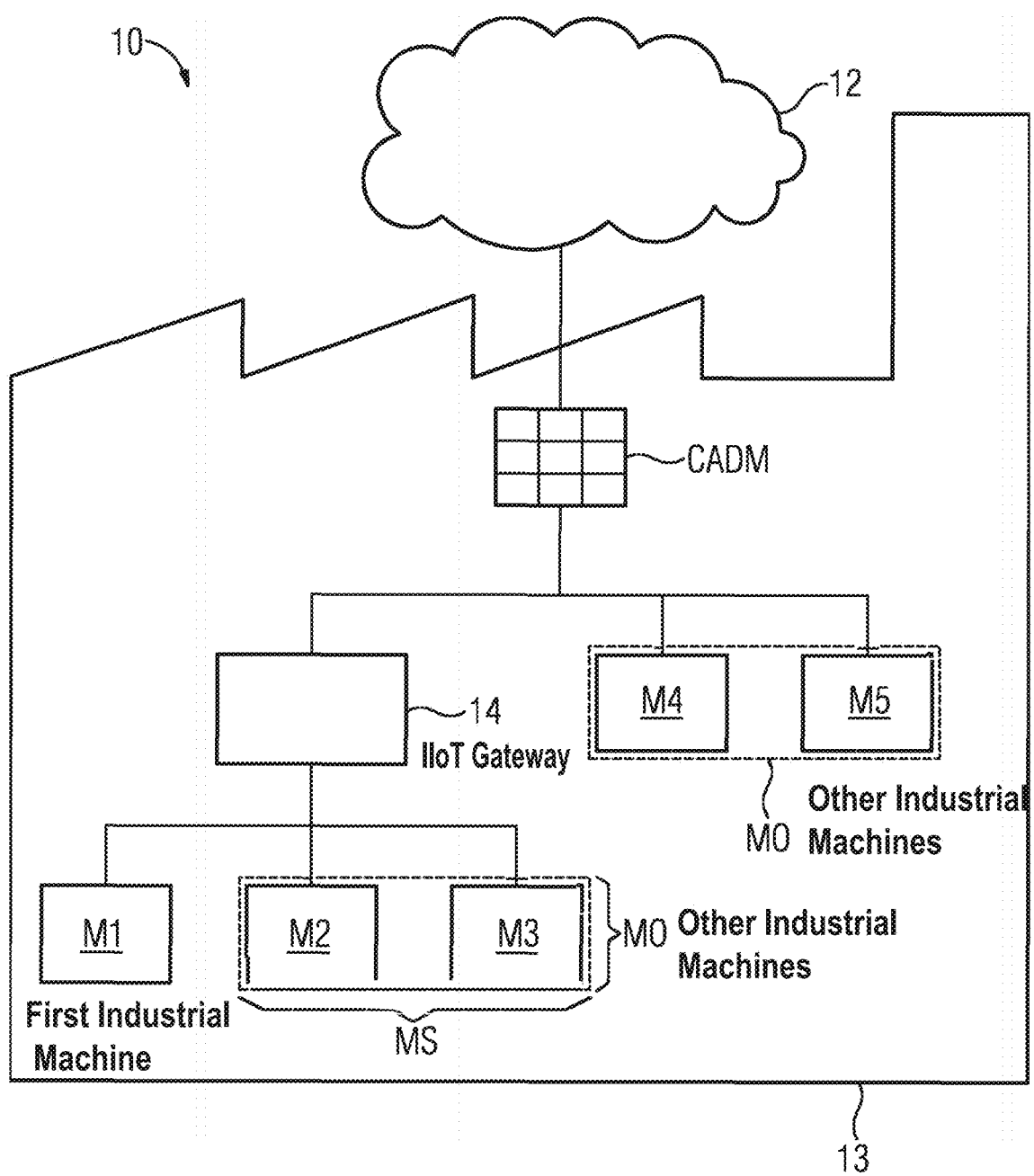
FIG. 1 is a sketch of one embodiment of a manufacturing unit that contains a number of industrial machines and a cloud system.

FIG. 1 shows one embodiment of a manufacturing unit 13 that includes a number of industrial machines M1-M5. M1 is a first industrial machine. M2 to M5 represent a number of other industrial machines MO. The industrial machines M1 to M3 are connected to an IoT cloud 12 via an IoT gateway 14. The industrial machines M4 and M5 are directly connected to the IoT cloud 12. The manufacturing unit 13 also includes a configuration anomaly detection module CADM. The configuration anomaly detection module CADM may be implemented on a computing device in the manufacturing unit 13 or may also be implemented in the IoT cloud 12. The configuration anomaly detection module CADM is able to perform the method for detecting a misconfiguration of a machine function of an industrial machine. In this case, the first industrial machine M1 is to be examined.

In this example, the first industrial machine M1 is a welding robot. In this case, a number of welding robots that have been manufactured by the same company are to be examined. The company that has manufactured the welding robots may be, for example, ABC. The configuration anomaly detection module CADM may create three different classes of industrial machines. Therefore, the two pieces of information (e.g., manufacturer ABC and application welding) are used to identify a set N of second industrial machines MS. N is of the numeric type and indicates how many industrial machines belong to MS. These second industrial machines MS are part of the several other industrial machines MO. The number of other industrial machines MO include, for example, the industrial machines M2 to M5. In this case, the industrial machines M4 and M5 are not from the manufacturer ABC, or the industrial machines M4 and M5 are not welding machines. In this case, the configuration anomaly detection module CADM would search for a misconfiguration in the machines M1 to M3. The industrial machines M4 and M5 would not be considered in this case. This method may be extended to several hundred or several thousand industrial machines.

In the example of FIG. 1, the machines M1 to M3 are welding robots from ABC that include a welding gun with six axes. These industrial machines M1 to M3 may be used to weld together certain pieces of a car body. The configuration anomaly detection module CADM may retrieve and/or create a number of configuration values or a number of configuration vectors that include the relevant configuration settings of these three industrial machines M1 to M3. It is possible that every configuration setting is extracted or only predetermined relevant configuration settings are created. For example, the configuration anomaly detection module may convert configuration settings into configuration values. The following table shows an example of a number of configuration settings of one of these three industrial machines.

TABLE 1

Exemplary configuration data of an industrial machine with converted configuration values

| Category | Name | Settings | Configuration values | Type |
| --- | --- | --- | --- | --- |
| Meta information | Manufacturer | ABC | 7 | List; non-numerical |
| Type | | 6-axis | 6 | numerical |
| Payload | weight | 25 kg | 25 | numerical |
| Application | Working mode | welding | 14 | non-numerical |
| Operational Settings | Cycle time | 15 seconds | 15 | numerical |

TABLE 1-continued

Exemplary configuration data of an industrial machine with converted configuration values

| Category | Name | Settings | Configuration values | Type |
| --- | --- | --- | --- | --- |
| Max. welding current | 25 A | Linear | 25 | numerical |
| Welding voltage | 440 V | Linear | 440 | numerical |
| Max. angular displacement Axis 1 | 2.5 radians | Linear | 2.5 | numerical |
| Max. angular displacement Axis 2 | 1.5 radians | Linear | 1.5 | numerical |
| Max. angular displacement Axis 3 | 0.5 radians | Linear | 0.5 | numerical |
| Max. angular displacement Axis 4 | 0.25 radians | Linear | 0.25 | numerical |
| Max. angular displacement Axis 5 | 3.0 radians | Linear | 3.0 | numerical |
| Max. angular displacement Axis 6 | 2.8 radians | Linear | 2.8 | numerical |
| Max. acceleration Axis 1 | 3 radians/sq. seconds | Linear | 3.0 | numerical |
| Max. acceleration Axis 2 | 4 radians/sq. seconds | Linear | 4.0 | numerical |
| Max. acceleration Axis 3 | 2 radians/sq. seconds | Linear | 2.0 | numerical |
| Max. acceleration Axis 4 | 2 radians/sq. seconds | Linear | 2.0 | numerical |
| Max. acceleration Axis 5 | 2 radians/sq. seconds | Linear | 2.0 | numerical |
| Max. acceleration Axis 6 | 2 radians/sq. seconds | Linear | 2.0 | numerical |
| Safety settings | Safety mode | ON | 1 | Binary |
| Manual override | | OFF | 0 | Binary |
| Network settings | Config mode | SLAVE | 0 | List; non-numerical |
| OPC Server | | OFF | 0 | Binary |
| Protocol | connection type | MODBUS | 2 | List; non-numerical |

The first two columns of this table contain the category and the specific type of configuration setting. The third column contains a value that is not the configuration value that is used for determining the deviation value of the machine function of the first industrial machine. The fifth column indicates the type of the configuration.

Using the fifth column, the elements of the third column are converted to numeric elements. These numeric elements are displayed in the fourth column and represent the configuration values. Especially these configuration values are used for detecting the misconfiguration. For example, the safety settings concerning the safety mode or the manual override may be converted to the figures 0 and 1. 0 would mean the term "off", and 1 would mean the term "on". Even if the type of configuration setting is a non-numerical type of configuration, a numerical value may be assigned.

For example, the term "SLAVE" in the "config mode" of the network settings may be assigned to the value 0. Also, the category (e.g., the network settings) may be assigned to a numerical value. This may be, for example, 4. In case of the safety setting, this may be 3. Also, the elements of the second column may be differentiated by applying corresponding figures. For example, the "config mode" may be assigned to the FIG. 1, the OPC server may be assigned to number 2, and the element protocol may be assigned to number 3. In this example, the figures 4, 1, and 0 would indicate that the "config mode" of the network settings would be a "SLAVE". According to this example, the entire table 1 may be converted into numerical figures. In Table 1, the application "welding" is assigned to the FIG. 14.

In this case, the configuration anomaly detection module CADM recognizes by the FIG. 14 the application "welding". This may be very useful when an automatic managing system 10 is used. This provides that for each industrial machine a number of figures may be created that may be used for further processing by the configuration anomaly detection module. These figures and configuration values may be combined in a matrix. In one embodiment, each industrial machine is assigned to its own matrix. This matrix may be regarded as configuration matrix.

According to the predetermined feature or the metadata as the predetermined feature, table 1 may contain fewer elements. If table 1 is converted into numerical figures, each element of this converted table represents a configuration value. In this case, a number of configuration values may be combined to a configuration vector or to a configuration matrix. This provides that every single industrial machine may include a configuration vector or configuration matrix of its own. This configuration matrix or configuration vector may be created by the configuration anomaly detection module CADM by extracting the relevant data from the industrial machines or by retrieving the information that may be available in an IoT database 24.

FIG. 2 shows another example of the managing system 10. Three industrial machines M1 to M3 are connected to the IoT cloud 12 via the IoT gateway 14, as in FIG. 1. The industrial machines M4 and M5 that belong to the number of other industrial machines MO and are not further analyzed in this case are connected to the IoT cloud 12 via an IoT agent 20. The IoT cloud 12 includes, beside the configuration anomaly detection module CADM, a number of other modules. The IoT cloud 12 includes an agent management 28, a visualization module 26 and a machine configuration database 22. The machine configuration database 22 or the IoT database 24 may include configuration data or configuration settings of industrial machines that are currently not connected to the IoT cloud 12. In this case, the configuration anomaly detection module CADM may analyze these industrial machines that are not connected to the IoT cloud 12 since their configuration data or settings may be stored in the machine configuration database 22 or the IoT database 24.

In this case, the configuration anomaly detection module CADM is a module that may perform the relevant acts of the present embodiments. The configuration anomaly detection module CADM may be any kind of digital resource. This may be a computer, a smartphone, a network of a number of computers, a cloud-server, and so on. The machines M4 and M5 have an embedded IoT agent 20 that connects these machines to the IoT cloud 12. The IoT agent 20 also may collect the configuration data of these industrial machines periodically or upon request, and the IoT agent 20 may send this data to the IoT cloud 12. In FIG. 2, the industrial machines M1 to M3 are connected to the IoT cloud 12 via the IoT gateway 14. The IoT gateway 14 also may collect the configuration data or configuration settings of these industrial machines M1 to M3 and may send this data to the IoT cloud 12.

In the following, an example is described how the present embodiments may work in this case. The following described acts are only representative and shall not to be considered to be limiting.

In a first act, a request for an anomaly detection of the configuration of a machine is triggered. In this case, the first industrial machine M1 is to be analyzed regarding a corresponding configuration. A request for detecting a misconfiguration of the first industrial machine M1 may be triggered manually by an administrator, or this request may be triggered as a result of an automated periodic assessment of the configuration anomaly detection module CADM. For example, this request may be triggered if a new industrial machine is connected to the IoT cloud 12 that has not been part of the IoT cloud 12 so far.

In the next act, the IoT gateway 14 that has access to the first industrial machine M1 determines the latest configuration parameters or configuration data of the first industrial machine M1 and sends this data to the configuration anomaly detection module CADM in the IoT cloud 12. This act may be bypassed if the configuration database in the IoT cloud 12 already has the latest configuration data for the first industrial machine M1. The configuration anomaly detection module CADM may calculate the configuration values or the configuration vectors of the first industrial machine M1. In one embodiment, a number of configuration values are summarized to a configuration vector or a configuration matrix.

Further, the configuration anomaly detection module CADM searches for the set N of similar machines. These similar machines are represented by the second industrial machines MS. To perform this, the configuration anomaly detection module CADM searches for industrial machines that correspond to the predetermined feature of the predetermined metadata.

In this case, the industrial machines M1 to M3 belong to the second industrial machines MS. This provides that the three industrial machines M1 to M3 are taken into account for the detection of the misconfiguration of the first industrial machine.

For example, the configuration anomaly detection module CADM calculates in the next act configuration values or configuration vectors for each industrial machine. In this case, the first configuration vector may be calculated for the first industrial machine M1, and another two configuration vectors may be calculated for the second industrial machines MS (e.g., M2 and M3). In one embodiment, each industrial machine has its own configuration vector or configuration matrix. The configuration vector may be generated by the configuration anomaly detection module CADM.

In the next act, the configuration anomaly detection module CADM may perform an anomaly detection. Therefore, the first configuration vector that belongs to the first industrial machine M1 is analyzed with respect to the other configuration vectors of the industrial machines M2 and M3. This anomaly detection may be performed by different analysis methods. For this analysis, for example, the k-nearest neighbors analysis, the support vector machine analysis, the neural network, and/or the correlation based analysis may be used.

In the next act, the configuration anomaly detection module CADM may provide the results of the last act to the visualization module 26. In one embodiment, the anomaly detection analysis may not only detect the misconfigured machine; the anomaly detection analysis may further indicate which configuration setting causes the misconfiguration of the industrial machine. This example may also be performed by analyzing another industrial machine than the first industrial machine. An administrator or operator may use the result of the configuration anomaly detection module CADM displayed in the visualization module 26 in order to rectify the configuration setting of the first industrial machine. If no misconfiguration has been detected, no measure would be necessary.

FIG. 3 shows an exemplary method flowchart of how a configuration of a first industrial machine (M1) may be managed. In act SI, the set (N) of second industrial machines may be identified. This may happen by aligning metadata of the first industrial machine (M1) with metadata of the other industrial machines (MO). The industrial machines (MO) having metadata that matches the metadata of the first industrial machines may be identified as the second industrial machines (MS).

In the next act S2, the first configuration value of the first industrial machine may be retrieved. The second configuration value may be retrieved from the second industrial machines. Every single second industrial machine may be assigned to a separate configuration value, or one single second configuration value for all second industrial machines may be created.

In the case that a configuration value is of a non-numerical type, this configuration value may be transformed in act S3 to a numerical value. For example, a configuration value may be the type of machine. This may be a welding robot, for example. This machine type welding robot may be assigned to a numerical value. Other machines would be assigned to another numerical value. This act S3 is not necessary if the configuration value is already a numerical value. For example, the maximum welding temperature would already be of numerical type. However, it may be useful to create a non-dimensional value. This may be a temperature value with reference to a maximum possible temperature for example.

In act S4, a deviation in the machine function may be determined. This depends on a relation of the first configuration value of the first industrial machine (M1) to the second configuration value of the set (N) of the second industrial machines (MS). The deviation may be determined by deviation values. Thereto, different types of analysis may be applied.

For example, all first configuration values may be bundled in a first configuration vector. All second configuration values may be bundled in a second configuration vector. These vectors may be used to determine a Euclidian distance between the first configuration vector and all second configuration vectors. Other methods such as Support Vector machine, k-nearest neighbors analysis, etc. may be applied to determine the deviation or the deviation values.

The misconfiguration of the first industrial machine may be detected in act S5. In this act, the deviation value may be, for example, compared with the predetermined threshold value.

This comparison may include the comparison of a number of deviation values with a number of threshold values. In most cases, if the deviation value exceeds a corresponding threshold value, the underlying or corresponding machine function is assigned to be misconfigured.

In a further act S6, a correction action may be performed. This act depends on the result of act S5. In the case of a misconfigured machine function of the first industrial machine (M1), the misconfigured machine function may be configured again or corrected so that the misconfiguration disappears. This correction may be performed remotely by using the network system or the cloud system.

It is also possible that the configuration anomaly detection module CADM generates a signal and sends the signal back to the IoT gateway 14 in order to automatically modify the configuration settings of the first industrial machine M1. For example, if the maximum welding current were too high, a signal that directly influences the configuration setting concerning the maximum welding current may be generated. In this case, the configuration setting concerning the maximum welding current may be rectified with respect to a correct configuration value.

This possible example shows that a misconfiguration of an industrial machine or an anomaly of an industrial machine may be automatically detected and may even be automatically rectified. The configuration anomaly detection module CADM may use the configuration settings of the second industrial machines MS in order to detect problematic configurations. Beforehand, the second industrial machines MS are extracted from the number of other industrial machines MO. This may be achieved by matching the industrial machines to predetermined metadata. The present embodiments describe how similar industrial machines may be vectorized concerning the configurations in an x-dimensional space. This results in several configuration vectors. These configuration vectors may be analyzed by artificial intelligence methods in order to detect a misconfigured industrial machine and, in the best case, also the specific machine function that is not correctly configured.

Since the detection of a misconfigured industrial machine may be automated, configuration errors in complex industrial assets may be quickly detected. The present embodiments may enhance the efficiency of application engineers and service personnel. The present embodiments may avoid production losses by detecting configuration errors in time, and the present embodiments may help to keep the configuration values optimal during the lifecycle of an industrial machine. The described method and examples show clearly that a misconfigured industrial machine may easily be detected without checking every single industrial machine manually. This may significantly simplify the maintenance of industrial machines. The present embodiments may offer potential to reduce downtime of industrial machines and to reduce production losses.

The present embodiments may take a form of a computer program product including program modules accessible from computer-usable or computer-readable medium storing program code for use by or in connection with one or more computers, processors, or instruction execution systems. For the purpose of this description, a computer-usable or computer-readable medium may be any apparatus that may contain, store, communicate, propagate, or transport the program for use by or in connection with the instruction execution system, apparatus, or device. The medium may be electronic, magnetic, optical, electromagnetic, infrared, or a semiconductor system, apparatus, or device. As propagation mediums in and of themselves as signal carriers are not included in the definition of physical computer-readable medium, the medium may include a semiconductor or solid state memory, magnetic tape, a removable computer diskette, random access memory (RAM), a read only memory (ROM), a rigid magnetic disk, and optical disk such as compact disk read-only memory (CD-ROM), compact disk read/write, and DVD. Both processors and program code for implementing each aspect of the technology may be centralized or distributed, or a combination thereof, as known to those skilled in the art.

While the present invention has been described in detail with reference to certain embodiments, the present invention is not limited to these embodiments. In view of the present disclosure, many modifications and variations would present themselves to those skilled in the art without departing from the scope of the various embodiments of the present invention, as described herein. The scope of the present invention is, therefore, indicated by the following claims rather than by the foregoing description. All changes, modifications, and variations coming within the meaning and range of equivalency of the claims are to be considered within their scope. All advantageous embodiments claimed in method claims may also be apply to system/apparatus claims.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for managing configuration of a machine function of a first industrial machine that is connectable to a network system that comprises a number of other industrial machines, the method comprising:
identifying a set of second industrial machines from the number of other industrial machines based on a predetermined feature of the first industrial machine in the number of other industrial machines;
retrieving or creating at least one first configuration value that relates to the machine function of the first industrial machine, and a second configuration value that relates to a machine function of the set of second industrial machines, the at least one first configuration value and the second configuration value each respectively representing the configuration of the machine function of the first industrial machine or one second industrial machine of the set of second industrial machines;
determining a respective separate deviation value for each first configuration value of the at least one first configuration value of the machine function of the first industrial machine depending on a relation of each first configuration value of the first industrial machine with the second configuration value of the set of second industrial machines;
detecting a misconfiguration of the machine function of the first industrial machine based on a comparison of the respective separate deviation value with a corresponding predetermined threshold value, wherein detecting the misconfiguration of the machine function of the first industrial machine comprises comparing, for each first configuration value of the at least one first configuration value, the respective separate deviation value with the corresponding predetermined threshold value; and
performing correction of the misconfiguration of the machine function of the first industrial machine using a correct configuration value.

2. The method of claim 1, wherein the at least one first configuration value and the second configuration value are each assigned to a respective configuration vector, and the respective configuration vector comprises a configuration value concerning a single industrial machine that is either the first industrial machine or the one second industrial machine of the set of second industrial machines.

3. The method of claim 2, wherein determining the respective separate deviation value comprises calculating a Euclidian distance from the respective configuration vector of the first industrial machine to all second industrial machines of the set of second industrial machines.

4. The method of claim 1, wherein the predetermined feature of the first industrial machine to identify the set of second industrial machines is based on metadata of the first industrial machine.

5. The method of claim 1, further comprising transforming a non-numerical first configuration value or a non-numerical second configuration value referring to a non-numerical machine function into a numerical value in the retrieving or creating for the determining of the respective separate deviation value.

6. The method of claim 5, wherein the transforming comprises assigning the non-numerical first configuration value or the non-numerical second configuration value to a binary value or a predetermined numerical value.

7. The method of claim 5, wherein the transforming is based on a table including a first column with category meta information, a second name column, a third settings column, a fourth configuration value column, and a fifth type column indicating a type of the configuration, and
wherein elements of the third settings column are transformed to numeric values by the fifth type column.

8. The of claim 1, wherein the misconfiguration of the machine function of the first industrial machine is detected when each respective separate deviation value is greater than the corresponding predetermined threshold value.

9. The method of claim 1, wherein determining the respective separate deviation value comprises applying a k-nearest neighbors analysis, a Support Vector Machine analysis, a neural network, a correlation based analysis, or any combination thereof to the first configuration value and the second configuration value.

10. The method of claim 1, wherein the method is triggered periodically, when a new industrial machine is connected to the network system, or periodically and when the new industrial machine is connected to the network system.

11. A managing system for managing a configuration of a machine function, the managing system comprising:
a first industrial machine to be examined regarding the configuration of the machine function;
a number of other industrial machines, wherein the first industrial machine is connectable to a network system comprising the number of other industrial machines; and
a configuration anomaly detection module that is configured to:
manage the configuration of the machine function of the first industrial machine, the management of the configuration of the machine function comprising:
identification of a set of second industrial machines from the number of other industrial machines based on a predetermined feature of the first industrial machine in the number of other industrial machines;
retrieval or creation of at least one first configuration value that relates to the machine function of the first industrial machine, and a second configuration value that relates to a machine function of the set of second industrial machines, the at least one first configuration value and the second configuration value each respectively representing the configuration of the machine function of the first industrial machine or one second industrial machine of the set of second industrial machines;
determination of a respective separate deviation value for each first configuration value of the at least one first configuration value of the machine function of the first industrial machine depending on a relation of each first configuration value of the first industrial machine with the second configuration value of the set of second industrial machines;

detection of a misconfiguration of the machine function of the first industrial machine based on a comparison of the respective separate deviation value with a corresponding predetermined threshold value, wherein the detection of the misconfiguration of the machine function of the first industrial machine comprises the comparison of, for each first configuration value of the at least one first configuration value, the respective separate deviation value with the corresponding predetermined threshold value; and performance of a correction of the misconfiguration of the machine function of the first industrial machine using a correct configuration value.

12. The managing system of claim 11, wherein the at least one first configuration value and the second configuration value are each assigned to a respective configuration vector, and the respective configuration vectors comprises a configuration value concerning a single industrial machine that is either the first industrial machine or the one second industrial machine of the set of second industrial machines.

13. The managing system of claim 12, wherein the determination of the respective separate deviation value comprises calculation of a Euclidian distance from the respective configuration vector of the first industrial machine to all second industrial machines of the set of second industrial machines.

14. The managing system of claim 11, wherein the predetermined feature of the first industrial machine to identify the set of second industrial machines is based on metadata of the first industrial machine.

15. The managing system of claim 11, wherein the misconfiguration of the machine function of the first industrial machine is detected when each respective separate deviation value is greater than the respective corresponding predetermined threshold value.

16. A non-transitory computer-readable storage medium that stores instructions executable by a processor to manage configuration of a machine function of a first industrial machine that is connectable to a network system that comprises a number of other industrial machines, the instructions comprising:

identifying a set of second industrial machines from the number of other industrial machines based on a predetermined feature of the first industrial machine in the number of other industrial machines;

retrieving or creating at least one first configuration value that relates to the machine function of the first industrial machine, and a second configuration value that relates to a machine function of the set of second industrial machines, the at least one first configuration value and the second configuration value each respectively representing the configuration of the machine function of the first industrial machine or one second industrial machine of the set of second industrial machines;

determining a respective separate deviation value for each first configuration value of the at least one first configuration value of the machine function of the first industrial machine depending on a relation of each first configuration value of the first industrial machine with the second configuration value of the set of second industrial machines;

detecting a misconfiguration of the machine function of the first industrial machine based on a comparison of the respective separate deviation value with a corresponding predetermined threshold value, wherein detecting the misconfiguration of the machine function of the first industrial machine comprises comparing, for each first configuration value of the at least one first configuration value, the respective separate deviation value with the corresponding predetermined threshold value; and performing correction of the misconfiguration of the machine function of the first industrial machine using a correct configuration value.

17. The non-transitory computer-readable storage medium of claim 16, wherein the instructions further comprise transforming a non-numerical first configuration value or a non-numerical second configuration value referring to a non-numerical machine function into a numerical value in the retrieving or creating for the determining of the respective separate deviation value.

18. The non-transitory computer-readable storage medium of claim 17, wherein the transforming comprises assigning the non-numerical first configuration value or the non-numerical second configuration value to a binary value or a predetermined numerical value.

19. The non-transitory computer-readable storage medium of claim 16, wherein determining the respective separate deviation value comprises applying a k-nearest neighbors analysis, a Support Vector Machine analysis, a neural network, a correlation based analysis, or any combination thereof to the first configuration value and the second configuration value.

20. The non-transitory computer-readable storage medium of claim 16, wherein the execution of the instructions is triggered periodically, in the case that a new industrial machine is connected to the network system, or periodically and in the case that the new industrial machine is connected to the network system.

* * * * *